US012768959B2

(12) United States Patent
Caron et al.

(10) Patent No.: US 12,768,959 B2
(45) Date of Patent: Oct. 20, 2026

(54) TIME-OF-FLIGHT DEMODULATION CIRCUITRY, TIME-OF-FLIGHT DEMODULATION METHOD, TIME-OF-FLIGHT IMAGING APPARATUS, TIME-OF-FLIGHT IMAGING APPARATUS CONTROL METHOD

(71) Applicant: Sony Semiconductor Solutions Corporation, Atsugi (JP)

(72) Inventors: Cédric Caron, Stuttgart (DE); Sua Kim, Stuttgart (DE); Stefan Isler, Stuttgart (DE); Kensei Jo, Stuttgart (DE); Atsumi Niwa, Stuttgart (DE)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 618 days.

(21) Appl. No.: 18/270,733

(22) PCT Filed: Jan. 5, 2022

(86) PCT No.: PCT/EP2022/050137
§ 371 (c)(1),
(2) Date: Jul. 3, 2023

(87) PCT Pub. No.: WO2022/148769
PCT Pub. Date: Jul. 14, 2022

(65) Prior Publication Data

US 2024/0061090 A1 Feb. 22, 2024

(30) Foreign Application Priority Data

Jan. 11, 2021 (EP) .................................... 21150898

(51) Int. Cl.
*G01C 3/08* (2006.01)
*G01S 7/481* (2006.01)
(Continued)

(52) U.S. Cl.
CPC .......... *G01S 7/4865* (2013.01); *G01S 7/4816* (2013.01); *G01S 7/484* (2013.01); *G01S 17/894* (2020.01)

(58) Field of Classification Search
CPC ...... G01S 7/4865; G01S 7/4816; G01S 7/484; G01S 17/894
See application file for complete search history.

(56) References Cited

U.S. PATENT DOCUMENTS

2017/0019658 A1 1/2017 Lee
2018/0284277 A1 10/2018 LaChapelle et al.
(Continued)

FOREIGN PATENT DOCUMENTS

CN 109991581 A 7/2019
CN 111598072 A * 8/2020 ............ H04N 23/56
(Continued)

OTHER PUBLICATIONS

International Search Report and Written Opinion mailed on Apr. 4, 2022, received for PCT Application PCT/EP2022/050137, filed on Jan. 5, 2022, 10 pages.
(Continued)

*Primary Examiner* — Mark Hellner
(74) *Attorney, Agent, or Firm* — XSENSUS LLP

(57) ABSTRACT

The present disclosure generally pertains to time-of-flight demodulation circuitry configured to: determine a light event pattern with an event-based light detection element of a plurality of event-based light detection elements; and determine, for a demodulation element of a plurality of demodulation elements, a timing for a demodulation signal to be applied to the demodulation element based on the light event pattern, wherein the demodulation element is associated with the event-based light detection element.

20 Claims, 8 Drawing Sheets

(51) Int. Cl.

| | |
|---|---|
| ***G01S 7/484*** | (2006.01) |
| ***G01S 7/4865*** | (2020.01) |
| ***G01S 17/894*** | (2020.01) |

(56) References Cited

U.S. PATENT DOCUMENTS

| | | | | |
|---|---|---|---|---|
| 2019/0056497 | A1 | 2/2019 | Pacala et al. | |
| 2020/0058205 | A1 | 2/2020 | Yaffe et al. | |
| 2020/0400793 | A1* | 12/2020 | Yin | G01S 7/4865 |
| 2021/0185284 | A1 | 6/2021 | Chan | |
| 2021/0223371 | A1* | 7/2021 | Meynants | G01S 17/36 |
| 2021/0325541 | A1* | 10/2021 | Kim | G01S 17/86 |
| 2022/0334253 | A1* | 10/2022 | Al Abbas | G01S 17/18 |

FOREIGN PATENT DOCUMENTS

| | | | |
|---|---|---|---|
| CN | 111602070 | A | 8/2020 |
| CN | 112153309 | A | 12/2020 |
| EP | 3171199 | A1 | 5/2017 |
| WO | 2020/152655 | A1 | 7/2020 |
| WO | WO-2021117642 | A1 | 6/2021 |

OTHER PUBLICATIONS

Della Rocca et al., "A 128×128 SPAD Dynamic Vision-Triggered Time of Flight Imager.", Proceedings of the IEEE, 2019.

* cited by examiner

140

Determine at least one light event pattern 131

↓

Control light source 132

↓

Deactive plurality of event-based light detection elements 141

↓

Control subset of demodulation elements 133

TIME-OF-FLIGHT DEMODULATION CIRCUITRY, TIME-OF-FLIGHT DEMODULATION METHOD, TIME-OF-FLIGHT IMAGING APPARATUS, TIME-OF-FLIGHT IMAGING APPARATUS CONTROL METHOD

CROSS-REFERENCE TO RELATED APPLICATIONS

The present application is based on PCT filing PCT/EP2022/050137, filed Jan. 5, 2022, and claims priority to EP Application Serial No. 21150898.1, filed Jan. 11, 2021, the entire contents of each are incorporated herein by reference.

TECHNICAL FIELD

The present disclosure generally pertains to time-of-flight demodulation circuitry, a time-of-flight demodulation method, a time-of-flight imaging apparatus, and a time-of-flight imaging apparatus control method.

TECHNICAL BACKGROUND

Generally, time-of-flight (ToF) systems are known. Such systems may be used for determining a depth to a scene and/or for capturing a depth image.

For example, in indirect ToF (iToF), modulated light is emitted, which gets reflected at the scene and measured at an image sensor (typically based on a plurality of CAPDs (current-assisted photonic demodulators)). The modulated light is then demodulated at each pixel and a phase-shift of the demodulated signal with respect to the original light signal may be indicative for the distance.

Furthermore, dynamic vision sensors (DVS) or event-based vision sensors (EVS) are known, which are passive sensors that are typically configured to detect an event based on a change of light intensity.

Although there exist techniques for acquiring a depth image, it is generally desirable to provide time-of-flight demodulation circuitry, a time-of-flight demodulation method, a time-of-flight imaging apparatus, and a time-of-flight imaging apparatus control method.

SUMMARY

According to a first aspect, the disclosure provides time-of-flight demodulation circuitry configured to:

determine a light event pattern with an event-based light detection element of a plurality of event-based light detection elements; and determine, for a demodulation element of a plurality of demodulation elements, a timing for a demodulation signal to be applied to the demodulation element based on the light event pattern, wherein the demodulation element is associated with the event-based light detection element.

According to a second aspect, the disclosure provides a time-of-flight demodulation method comprising:

determining a light event pattern with an event-based light detection element of a plurality of event-based light detection elements; and determining, for a demodulation element of a plurality of demodulation elements, a timing for a demodulation signal to be applied to the demodulation element based on the light event pattern, wherein the demodulation element is associated with the event-based light detection element.

According to a third aspect, the disclosure provides a time-of-flight imaging apparatus comprising:

a plurality of event-based light detection elements each configured to detect a light event, based on which at least one light event pattern is determined;

a plurality of demodulation elements, wherein each demodulation element is associated with at least one event-based imaging element;

a light source configured to emit modulated light; and control circuitry configured to:

determine the at least one light event pattern;

control the light source to emit modulated light based on the determined at least one light event pattern; and control a subset of the plurality of demodulation elements to apply a demodulation signal, if the at least one light event pattern is detected with a subset of associated event-based light detection elements.

According to a fourth aspect, the disclosure provides a time-of-flight imaging apparatus control method for a time-of-flight imaging apparatus, wherein the time-of-flight imaging apparatus includes a plurality of event-based light detection elements each configured to detect a light event, based on which at least one light event pattern is determined; a plurality of demodulation elements, wherein each demodulation element is associated with at least one event-based imaging element; and a light source configured to emit modulated light; the method comprising:

determining the at least one light event pattern;

controlling the light source to emit modulated light based on the determined at least one light event pattern; and controlling a subset of the plurality of demodulation elements to apply a demodulation signal, if the at least one light event pattern is detected in a subset of associated event-based light detection elements.

Further aspects are set forth in the dependent claims, the following description and the drawings.

BRIEF DESCRIPTION OF THE DRAWINGS

Embodiments are explained byway of example with respect to the accompanying drawings, in which.

DETAILED DESCRIPTION OF EMBODIMENTS

Figure 1:
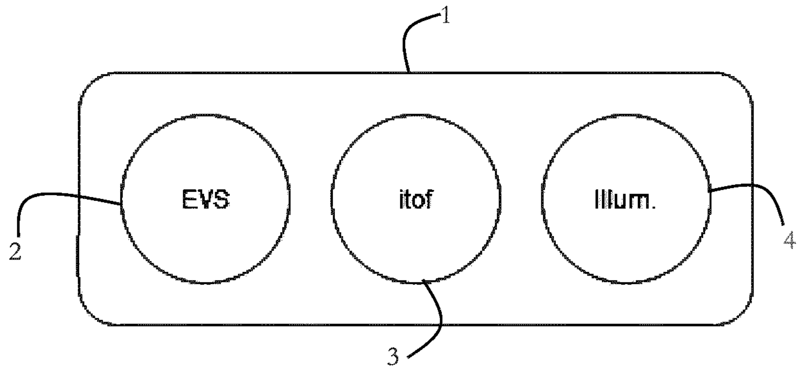
FIG. 1 depicts a schematic view of an embodiment of a ToF imaging apparatus according to the present disclosure.

Before a detailed description of the embodiments starting with FIG. 1 is given, general explanations are made.

As mentioned in the outset, iToF is generally known. However, known iToF systems may have a high power consumption due to at least one of the following: use of an active illumination, application of demodulation signals at each pixel, possible post processing of iToF data.

It has been recognized, in order to reduce the power consumption deriving from the need to demodulate at every pixel, that it may be suitable to only demodulate pixels which capture a field of view of a region of interest, or at which it is expected to have no disturbing influence of ambient light. This could also decrease post processing capability since less pixel data had to be processed.

Hence, it has been recognized that event-based light detection elements (e.g. based on a dynamic vision sensor (DVS) or event-based vision sensor (EVS)) may be utilized to determine the region of interest or an ambient light pattern.

In other words, it has been recognized that power consumption issues of an iToF measurement may at least partly be tackled by and EVS/DVS-assisted spatial and temporal region of interest determination for depth measurement with a ToF sensor (also other sensors than iToF sensors).

EVS (which is, in some embodiments, used as a synonym to DVS) are known to have a high temporal resolution and a low power consumption since they are passive sensors.

Hence, the power consumption of an iToF imaging apparatus may, according to the present disclosure, further be reduced by leveraging EVS data to illuminate, integrate, readout, stream, and post process where (i.e. to a region, object, or the like) and when (i.e. when the reliability of a measurement is above a predetermined value) it is needed.

Therefore, some embodiments pertain to time-of-flight demodulation circuitry configured to: determine a light event pattern with an event-based light detection element of a plurality of event-based light detection elements; and determine, for a demodulation element of a plurality of demodulation elements, a timing for a demodulation signal to be applied to the demodulation element based on the light event pattern, wherein the demodulation element is associated with the event-based light detection element.

Circuitry may pertain to a processor (e.g. a CPU (central processing unit), GPU (graphic processing unit), an FPGA (field programmable gate array), a computer, server, a camera device, also more than one or combinations of these units, as it is generally known to the person skilled in the art.

Furthermore, the present disclosure may be applied within the field of iToF, i.e. a plurality of CAPDs (current assisted photonic demodulators), or any other kind of demodulation element, may be controlled with the ToF demodulation circuitry according to the present disclosure.

However, not only demodulation elements may be controlled with the ToF demodulation circuitry, but also event-based light detection elements. In some embodiments, the event-based light detection elements may only be read out by the ToF demodulation circuitry or at least data stemming from the event-based light detection elements may be processed by the ToF demodulation circuitry, no matter what their source is (e.g. a storage, a processor, or the like).

Hence, in some embodiments, the ToF demodulation circuitry may be configured to determine a light event pattern with an event-based light detection element of a plurality of event-based light detection elements.

The event-based light detection element may be configured to detect light events, such as a change of light intensity, brightness, or the like, and may correspond to a (single or multiple) pixels of a dynamic vision sensor (DVS), event-based vision sensor (EVS), or the like. Hence, the plurality of event-based light detection elements may correspond to a DVS/EVS, for example, or may be provided as single pixels on a hybrid sensor, wherein the remaining pixels may be based on the demodulation elements.

If the event-based light detection elements are provided on a DVS or EVS, plurality of demodulation elements may be provided on an iToF sensor, as it is generally known.

As mentioned above, in some embodiments, the ToF demodulation circuitry is configured to determine a light event pattern.

For determining the light event pattern, detected light events are obtained from the event-based light detection element, and the pattern may be determined, if it is determined that one or multiple light events are detected repetitively, such as one event each five milliseconds, without limiting the present disclosure in that regard. For example, a light event pattern may also be established when duplets, triplets, or the like of events are detected which occur at predetermined points of time. Also, an event duplet may be alternating with a single event or an event triplet, for example.

According to the present disclosure, based on the light event pattern, a timing for a demodulation signal to be applied to the demodulation element may be determined.

For example, if the light event pattern is indicative for ambient light, it may be desired to perform a ToF measurement at a point of time at which the ambient light is at a minimum, i.e. when it is expected that no event is detected. Hence, the demodulation signal may be timed such that it is applied when no event is expected, such that an interference of the Tof measurement with ambient light is avoided or reduced. Accordingly, a timing of a light source may be synchronized with the demodulation signal and may also depend on the determined light event pattern.

Furthermore, the demodulation element at which the demodulation signal is applied may be associated with the event-based light detection element. Hence, according to the present disclosure, only the demodulation elements may be driven for which it is expected that there is no or a minimum interference with ambient light, such that the Tof measurement may be limited to a field of view or a region of interest based on the light event pattern.

In other words, the event-based light detection elements may trigger a ToF measurement in demodulation elements which are associated with the respective event-based light detection elements.

The association of the event-based light detection elements with the demodulation elements is not limited to a one-to-one correspondence, for example since the plurality of event-based light detection elements may have a different number than the demodulation elements. However, even if they are the same in number, the present disclosure is not limited to a one-to-one correspondence. Generally, if the light event pattern is determined in any predetermined number of event-based light detection elements, any predetermined number of demodulation elements may be driven.

However, according to the present disclosure, based on the event-based light detection elements, a field of view or a region of interest may be determined for the demodulation elements. Hence, the event-based light detection elements may be indicative of which of the demodulation elements are driven.

Consequently, in some embodiments, the time-of-flight demodulation circuitry is further configured to: determine a subset of the plurality of event-based light detection elements; and control a subset of the plurality of demodulation elements based on the determined subset of event-based light detection elements.

In some embodiments, the subset of the plurality of event-based light detection elements is determined based on the light event pattern.

For example, the subset may include the event-based light detection elements based on which roughly the same pattern can be determined. In another example, light event patterns of different event-based light detection elements may be different, but a mutual timing for the application of the demodulation signal may be determined, such that the subset of event-based light detection elements is determined based on the mutual timing. For example, a mutual time period may be determined in which no light event may be detected in any of the event-based light detection elements, such that all event-based light detection elements may be grouped into the subset (i.e. also all elements may correspond to the subset).

In some embodiments, for each event-based light detection element, it is determined whether a light event pattern can be determined. For each event-based light detection element for which a light event pattern is determined, it is determined, how subsets can be generated (i.e. which event-based light detection elements can be grouped) and it may be decided for a subset based on, for example, a number of event-based light detection elements (e.g. the subset with the most/less/predetermined number of elements), a least amount of ambient light, or the like.

In some embodiments, the light event pattern is indicative of a plurality of consecutive light detection events.

As discussed herein, the consecutive light detection events may be (roughly) equally spaced in time, for example. However, in some embodiments, the consecutive light detection events may only be limited to be deterministic, such that a light event pattern can be determined, such that a demodulation signal can be applied to the demodulation element(s).

In some embodiments, the time-of-flight demodulation circuitry is further configured to: apply the demodulation signal to the demodulation element between two consecutive light detection events, as discussed herein.

In some embodiments the light event pattern is representative of ambient light, as discussed herein.

Some embodiments pertain to a time-of-flight demodulation method including: determining a light event pattern with an event-based light detection element of a plurality of event-based light detection elements; determining, for a demodulation element of a plurality of demodulation elements, a timing for a demodulation signal to be applied to the demodulation element based on the light event pattern, wherein the demodulation element is associated with the event-based light detection element, as discussed herein.

The ToF demodulation method may be carried out with ToF demodulation circuitry according to the present disclosure.

In some embodiments, the method further includes determining a subset of the plurality of event-based light detection elements; and controlling a subset of the plurality of demodulation elements based on the determined subset of event-based light detection elements, as discussed herein. In some embodiments, the subset of the plurality of event-based light detection elements is determined based on the light event pattern, as discussed herein. In some embodiments, the light event pattern is indicative of a plurality of consecutive light detection events, as discussed herein. In some embodiments, the time-of-flight demodulation method further includes: applying the demodulation signal to the demodulation element between two consecutive light detection events, as discussed herein. In some embodiments the light event pattern is representative of ambient light, as discussed herein.

Some embodiments pertain to a time-of-flight imaging apparatus including: a plurality of event-based light detection elements each configured to detect a light event, based on which at least one light event pattern is determined; a plurality of demodulation elements, wherein each demodulation element is associated with at least one event-based imaging element; a light source configured to emit modulated light; and control circuitry configured to: determine the at least one light event pattern; control the light source to emit modulated light based on the determined at least one light event pattern; and control a subset of the plurality of demodulation elements to apply a demodulation signal, if the at least one light event pattern is detected with a subset of associated event-based light detection elements.

Hence, as already mentioned above, each demodulation element may be associated with at least one event-based light detection element, such that any correspondence of event-based light detection elements and demodulation elements is envisaged according to the present disclosure. As also mentioned above, multiple (at least one) light event patterns may be determined.

Furthermore, the ToF imaging apparatus may include a light source, e.g. a modulated light source which is configured to emit modulated light. However, the present disclosure is not limited to a modulated light source since also a structured light source is envisaged, as will be explained further below.

The ToF imaging apparatus may further include control circuitry, which may be partly overlapping or corresponding to the demodulation circuitry or may be completely different circuitry. The control circuitry may be based on any type of processor(s).

The control circuitry may be configured to determine the at least one light event pattern based on the detected light events of the plurality of event-based light detection elements, such that the control circuitry is, in some embodiments, further configured to control the light source to emit modulated light (in case of a modulated light source) based on the determined light event pattern(s), such that a subset of the plurality of demodulation elements can be controlled accordingly.

Hence, the control circuitry may be configured to synchronize the light source and the demodulation elements (or the demodulation signal(s)) based on the at least one light event pattern, such that the emitted light can be demodulated (or generally detected) when a minimum of events is expected, or, as phrased above: the control circuitry is further configured to control the subset of the plurality of demodulation elements to apply a demodulation signal, if the at least one light event pattern is detected with a subset of associated event-based light detection elements.

As discussed herein, the plurality of event-based light detection elements and the plurality of demodulation elements may be provided on different image sensors or on the same image sensor, i.e. on a hybrid sensor.

In case of the respective elements being provided on different sensors, the time-of-flight imaging apparatus further includes: a first imaging portion including the plurality of event-based light detection elements; and a second imaging portion including the plurality of demodulation elements.

The first imaging portion may be included in a DVS/EVS, as discussed herein, whereas the second imaging portion may be included in a CAPD-based sensor, as discussed herein.

In some embodiments, the second imaging portion is disposed between the first imaging portion and the light source.

Hence, the second imaging portion may be provided close to the light source, such that a deterioration of the emitted light may be kept as low as possible.

However, the relative positions of the respective elements may be calibrated such that a deterioration may be kept low, as well.

In case of the respective element being provided on the same sensor, the time-of-flight imaging apparatus, further including: an imaging portion including the plurality of event-based light detection elements and the plurality of demodulation elements.

In such embodiments, the respective imaging elements may be provided on a hybrid sensor, as discussed herein.

Hence, in some embodiments, the event-based light detection elements and the demodulation elements are tightly coupled (e.g. on a hybrid sensor) or loosely coupled (e.g. as two sensors).

Tight coupling may also refer to a direct communication between the EVS and the iToF sensor, whereas in loose coupling, a processor (e.g. an application processor) may be a communication instance between the EVS and the iToF sensor.

The present disclosure is generally not limited to a combination between EVS and an iToF sensor, since the EVS may also be combined with any other sensor, such as dToF (e.g. based on SPAD (single photon avalanche diode) technology), radar, RGB, or the like.

Moreover, a passive VIS/NIR (visible/near infrared) sensor may be combined with an iToF sensor In some embodiments, the light event pattern is representative of ambient light, as discussed herein.

In some embodiments, the control circuitry is further configured to: deactivate the plurality of event-based light detection elements for a predetermined time after the light source emits the modulated light.

Since a ToF measurement may be initiated when the light source emits light, there is no need to detect events. Furthermore, the emitted light would possibly be detected in the event-based light detection elements, for which there would be no need either. However, deactivating the event-based light detection elements may also include only deactivating a readout of the elements and not completely turning the elements off.

The predetermined time after the light source emits the light may include a point of time or a time period when the modulated light is expected to be measured, which may depend on a predetermined distance range.

If the event-based light detection elements are not deactivated, in some embodiments, a band-pass filter is applied such that an event is not triggered by a ToF illumination signal.

Some embodiments pertain to a time-of-flight imaging apparatus control method for a time-of-flight imaging apparatus, wherein the time-of-flight imaging apparatus includes a plurality of event-based light detection elements each configured to detect a light event, based on which at least one light event pattern is determined; a plurality of demodulation elements, wherein each demodulation element is associated with at least one event-based imaging element; and a light source configured to emit modulated light; the method including: determining the at least one light event pattern; controlling the light source to emit modulated light based on the determined at least one light event pattern; and controlling a subset of the plurality of demodulation elements to apply a demodulation signal, if the at least one light event pattern is detected in a subset of associated event-based light detection elements, as discussed herein.

The ToF imaging apparatus control method may be carried out with control circuitry or demodulation circuitry according to the present disclosure.

In some embodiments, the time-of-flight imaging apparatus control method further includes: deactivating the plurality of event-based light detection elements for a predetermined time after the light source emits the modulated light, as discussed herein.

As stated above, the present disclosure is generally not limited to a combination between EVS and iToF, since also structured light (such as in spot ToF) may be used and field of view may be recognized with the EVS, for example (which will be discussed further below under reference of FIG. 7).

It may depend on the distance to the scene, which particular combination is used. For example, a combination of EVS and iToF may be used for shorter distances than a combination of EVS and spot ToF.

For a combination of EVS and iToF, asynchronous time domain multiple access (TDMA) may be envisaged, which will be discussed further below. Generally, in TDMA, the EVS/DVS may be used to monitor whether (concurrent) modulated light is used in the scene or whether a time slot is free to be used for iToF acquisition.

In TDMA, the EVS is not used to filter out the wavelength of the ambient (flickering) light (which would also be possible according to the present disclosure), but to indicate at which time an iToF measurement can be performed with a low disturbance of the ambient light.

In such a case, the ambient light may be assumed (but not limited) to be operating at fifty or sixty Hertz, for example and may be based on a repetitive pattern.

Hence, in some embodiments, the plurality of event-based light detection elements monitor the scene for flickering ambient light.

Based on this monitoring, an optimum may be determined (e.g. by control circuitry or demodulation circuitry according to the present disclosure) to trigger an (active) illumination system for minimizing interferences from ambient light.

Generally, the following algorithm may be used according to the present disclosure:

The plurality of event-based light detection elements (or an EVS) may monitor a scene and determine and it may be determined when and where there is activity within the field of view of the system.

A light source may be triggered whenever there is sufficient activity within the field of view.

Furthermore, the light source may be provided with the relevant region of interest(s) and the following may be adjusted:

region(s) to be illuminated (if the light source features a steerable/configurable illuminator)

active pixels in the sensor (for integration and readout)

part of data to be post-processed in a data path.

Hence, in some embodiments, only the ROI may be illuminated and a corresponding ROI in the demodulation elements may be determined.

Generally, since an adaptive illumination and/or an adaptive ROI determination is possible according to the present disclosure, efficient motion detection may be possible, as well.

As discussed above, in some embodiments, the imaging apparatus is based on a light source configured to emit structured light.

Hence, some embodiments pertain to a time-of-flight imaging apparatus including: a plurality of event-based light detection elements configured to detect a light structure; a plurality of demodulation elements configured to generate time-of-flight data, wherein each demodulation element is associated with at least one event-based imaging element; a light source configured to emit structured light; and control circuitry configured to: correct the time-of-flight data based on the light structure.

The light structure may be based on the structured light. For example, the light source may emit the structured light in a predefined way, but the structured light may appear different depending on the scene which is illuminated. For example, the structured light may be regularly distributed on a flat wall, but distorted on a ball, or the like.

However, depending on the scene, a multipath interference, as it is generally known, may exist. For example, a scene with multiple hollows may lead to a multipath interference, which may deteriorate the time-of-flight data.

Hence, based on the light structure, the multipath interference may be determined, in some embodiments.

In some embodiments, the time-of-flight data are corrected based on the determined multipath interference.

In such embodiments, a spot pattern, for example, may be projected on the scene and the light structure may be determined with the event-based imaging elements. After that (or before), a full field pattern may be projected and an iToF measurement may be performed. Based on the light structure (i.e. the EVS sparse structured light measurement), a multipath error in the full field iToF measurement may be corrected.

In some embodiments, the light source is configured to emit, as the structured light, a spike pattern for compensating a multipath interference. For generating the spike pattern, the light source may be configured to perform a full-field illumination and a spot pattern illumination at the same time.

In such embodiments, a spike pattern may be projected and both the light structure may be determined and an iToF measurement may be performed roughly in parallel. The light structure may be used to correct a multipath error in the iToF measurement.

Figure 7:
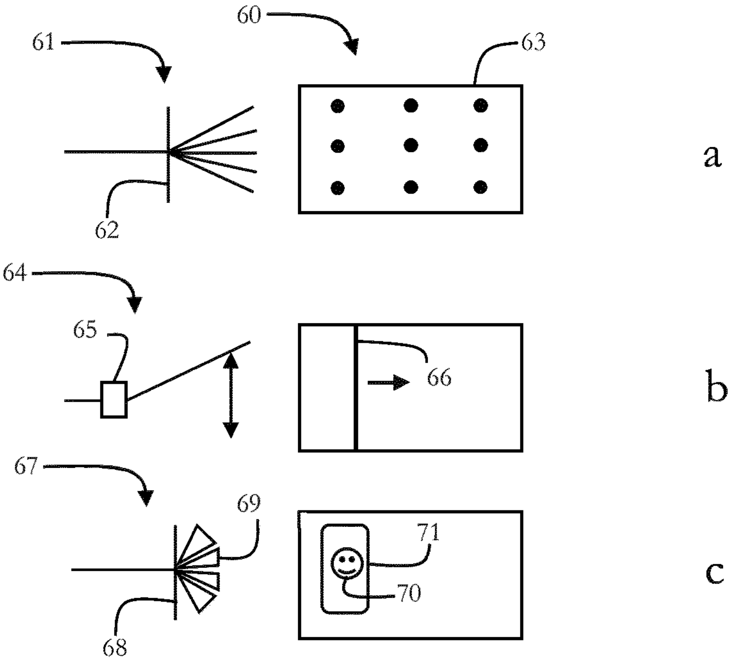
FIG. 7 depicts further applications of the methods of the present disclosure when a structured light source is used.

The light source may include a spot illuminator, a scanning line illuminator, a spike illuminator (e.g. full field and spot at the same time), a switchable illuminator (which is switchable between spot and full field), or any other illumination source, such as the illumination sources which are discussed under reference of FIG. 7, without limiting the present disclosure in that regard since the only requirement may be to have structured light.

In some embodiments, the plurality of event-based light detection elements may be based on an EVS, as discussed herein, and the plurality of demodulation elements may be based on an iToF sensor, as discussed herein, wherein also a hybrid sensor may be envisaged, as discussed herein.

iToF may usually be used for distance measurements above a minimum distance since, otherwise, the iToF pixels may saturate.

However, in some embodiments, it is possible to extend a (working) range of an iToF measurement, hence the ToF data are corrected in the way that they are indicative of a larger distance range.

In such embodiments, a spot pattern may be projected and the light structure may be determined.

If the iToF measurement (i.e. the demodulation elements) is saturated, the light structure measurement can be used instead of the iToF measurement. The determined light structure may also be indicative for a depth since the light structure may be deteriorated or distorted with respect to a compared/expected light structure, which may be standardized, for example.

Hence, if the demodulation elements are saturated, an event-based structured light measurement can be performed in order to increase the measurement range.

In summary: In some embodiments, the light structure is based on the structured light. In some embodiments, the time-of-flight imaging apparatus is further configured to: determine a multipath interference based on the light structure. In some embodiments, the time-of-flight imaging apparatus is further configured to: correct the time-of-flight data based on the determined multipath interference. In some embodiments, the time-of-flight imaging apparatus is further configured to: project a spot pattern on a scene for determining the light structure; project a full-field pattern on the scene for determining the time-of-flight data. In some embodiments, the time-of-flight imaging apparatus is further configured to: project a spike pattern on a scene for determining the light structure and the time-of-flight data. In some embodiments, the time-of-flight imaging apparatus of is further configured to: correct the time-of-flight data by extending a distance range of the time-of-flight data based on the light structure.

Some embodiments pertain to a time-of-flight imaging apparatus control method, the time-of-flight imaging apparatus including a plurality of event-based light detection elements configured to detect a light structure; a plurality of demodulation elements configured to generate time-of-flight data, wherein each demodulation element is associated with at least one event-based imaging element; a light source configured to emit structured light; the control method including: correcting the time-of-flight data based on the light structure.

The time-of-flight imaging apparatus control method may be carried out with a time-of-flight imaging apparatus according to the present disclosure.

In some embodiments, the light structure is based on the structured light, as discussed herein. In some embodiments, the method further includes: determining a multipath interference based on the light structure, as discussed herein. In some embodiments, the method further includes: correcting the time-of-flight data based on the determined multipath interference, as discussed herein. In some embodiments, the method further includes: projecting a spot pattern on a scene for determining the light structure; and projecting a full-field pattern on the scene for determining the time-of-flight data, as discussed herein. In some embodiments, the method further includes: projecting a spike pattern on a scene for determining the light structure and the time-of-flight data, as discussed herein. In some embodiments, the method further includes: correcting the time-of-flight data by extending a distance range of the time-of-flight data based on the light structure, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, there is depicted a schematic view of an embodiment of a ToF imaging apparatus 1 according to the present disclosure.

The time-of-flight imaging apparatus 1 includes an EVS 2 including a plurality of event-based light detection elements, an iToF sensor 3 including a plurality of demodulation elements, and an active illumination 4 (modulated light source) for carrying out an iToF measurement based on a light event pattern determined with the EVS.

The time-of-flight imaging apparatus 1 further includes control circuitry (not depicted) which determines the light event pattern and determines a point of time at which the illumination 4 is controlled to illuminate a scene. Furthermore, the control circuitry 4 determines pixels of the iToF sensor 3 which are demodulated (for detecting the modulated light from the illumination 4) based on pixels of the EVS for which a light event pattern is determined, as discussed herein.

The iToF sensor is provided between the EVS 2 and the illumination 4, as discussed herein.

Figure 2:
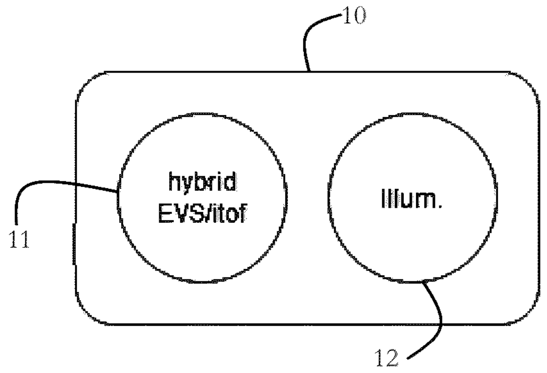
FIG. 2 depicts a schematic view of a further embodiment of a ToF imaging apparatus according to the present disclosure.

FIG. 2 depicts a schematic view of a further embodiment of a ToF imaging apparatus 10 according to the present disclosure. The ToF imaging apparatus 10 is different from the ToF imaging apparatus 1 in that a hybrid sensor 11 is included, which has both event-based light detection elements and demodulation elements on the same sensor. Furthermore, an active illumination 12 is included next to the hybrid sensor 11.

Figure 3:
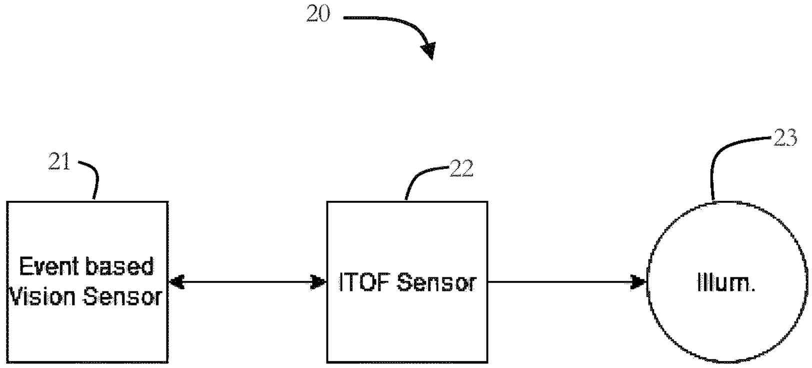
FIG. 3 depicts a high-level view of a ToF imaging apparatus according to the present disclosure in a block diagram.

FIG. 3 depicts a high-level view of a ToF imaging apparatus 20 according to the present disclosure in a block diagram.

The ToF imaging apparatus 20 includes an EVS 21, an iToF sensor 22, and an active illumination 23. Demodulation circuitry and control circuitry according to the present disclosure is included, in this embodiment, in the iToF sensor 22.

The EVS 21 is configured to detect, in each pixel, a plurality of light events, which are transformed into data and transmitted to the iToF sensor 22, which determines, at least for one pixel of the EVS 21, if possible, at least one light event pattern (i.e. at least one light event pattern) and determines, based on the light event patterns, pixels of the iToF sensor 22 which shall be demodulated and at which point of time an iToF measurement shall be performed. Based on this point of time, the iToF sensor 22 controls the illumination 23 to emit modulated light for performing the iToF measurement.

Figure 4:
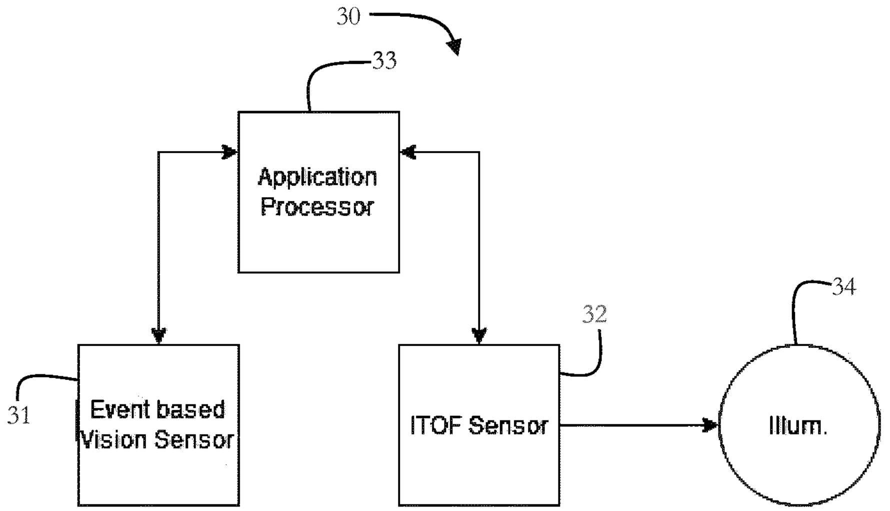
FIG. 4 depicts a high-level view of a further embodiment of an ToF imaging apparatus according to the present disclosure in a block diagram.

FIG. 4 depicts a high-level view of a further embodiment of an ToF imaging apparatus 30 according to the present disclosure in a block diagram.

The ToF imaging apparatus 30 includes an EVS 31, an iToF sensor 32, an application processor 33, and an active illumination 34.

The application processor 33 is configured to communicate with the EVS 31 and the iToF sensor 32. Based on light detection events detected in the EVS 31, the application processor is configured to determine at least one light event pattern, as discussed herein. Based on the at least one light event pattern, the application processor 33 determines pixels of the iToF sensor 32 to be controlled for performing an iToF measurement. Furthermore, the application processor 33 determines a point of time at which the iToF measurement is being performed. Based on this information, the iToF sensor triggers the illumination 34, such that the iToF measurement in performed.

Hence, in this embodiment, the demodulation circuitry and the control circuitry are distributed between the application processor and the iToF sensor.

Generally, the demodulation circuitry and/or control circuitry can be constituted by any other entity, such as the EVS, the illumination, a standalone processor, or the like.

Figure 5:
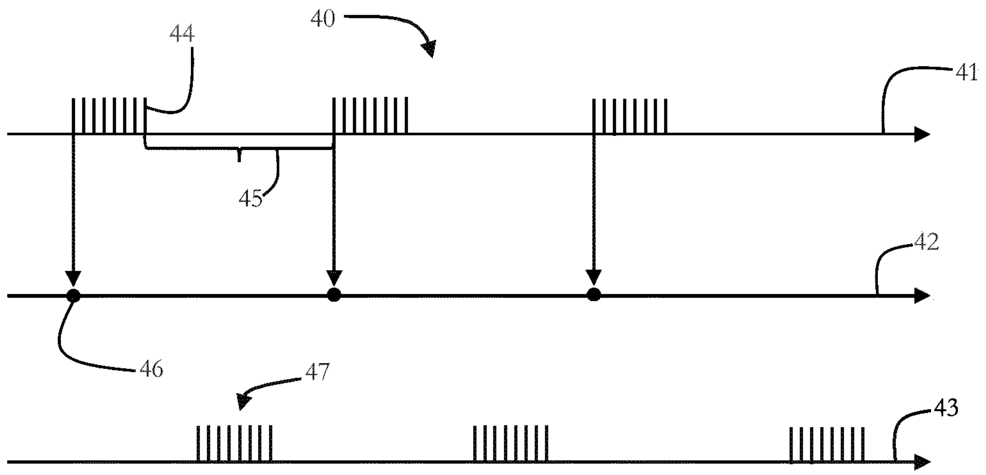
FIG. 5 depicts a schematic view of a timing diagram according to the present disclosure.

FIG. 5 depicts a schematic view of a timing diagram 40 according to the present disclosure, to which it is also referred to as TDMA (time division multiple access).

The timing diagram 40 includes timing axes 41 to 43, wherein on axes 41 and 43, a light intensity is shown, and on axis 42, events are shown.

The axis 41 depicts a light intensity of ambient light. In this embodiment, the ambient light is deriving from an external modulated light source (i.e. another ToF camera, for example), such that external modulated light pulses 44 constitute the ambient light. The ambient light is emitted, from the external modulated light source, in an ambient light pattern, such that multiple external modulated light pulses 44 are followed by a break 45 (due to a readout of the other ToF camera), and after the break 45, multiple extern modulated light pulses 44 are emitted again.

Based on the ambient light pattern, an EVS of a ToF imaging apparatus according to the present disclosure detects light events 46, based on which a light event pattern is determined.

The light event pattern is also indicative of the break 45 assuming a "typical" operation of the other ToF camera, such that it can be estimated how long a typical light emission lasts, such that, based on the light event pattern, a light source of the ToF imaging apparatus according to the present disclosure is controlled to emit modulated light 47 during the breaks 45 of the ambient light.

Figure 6:
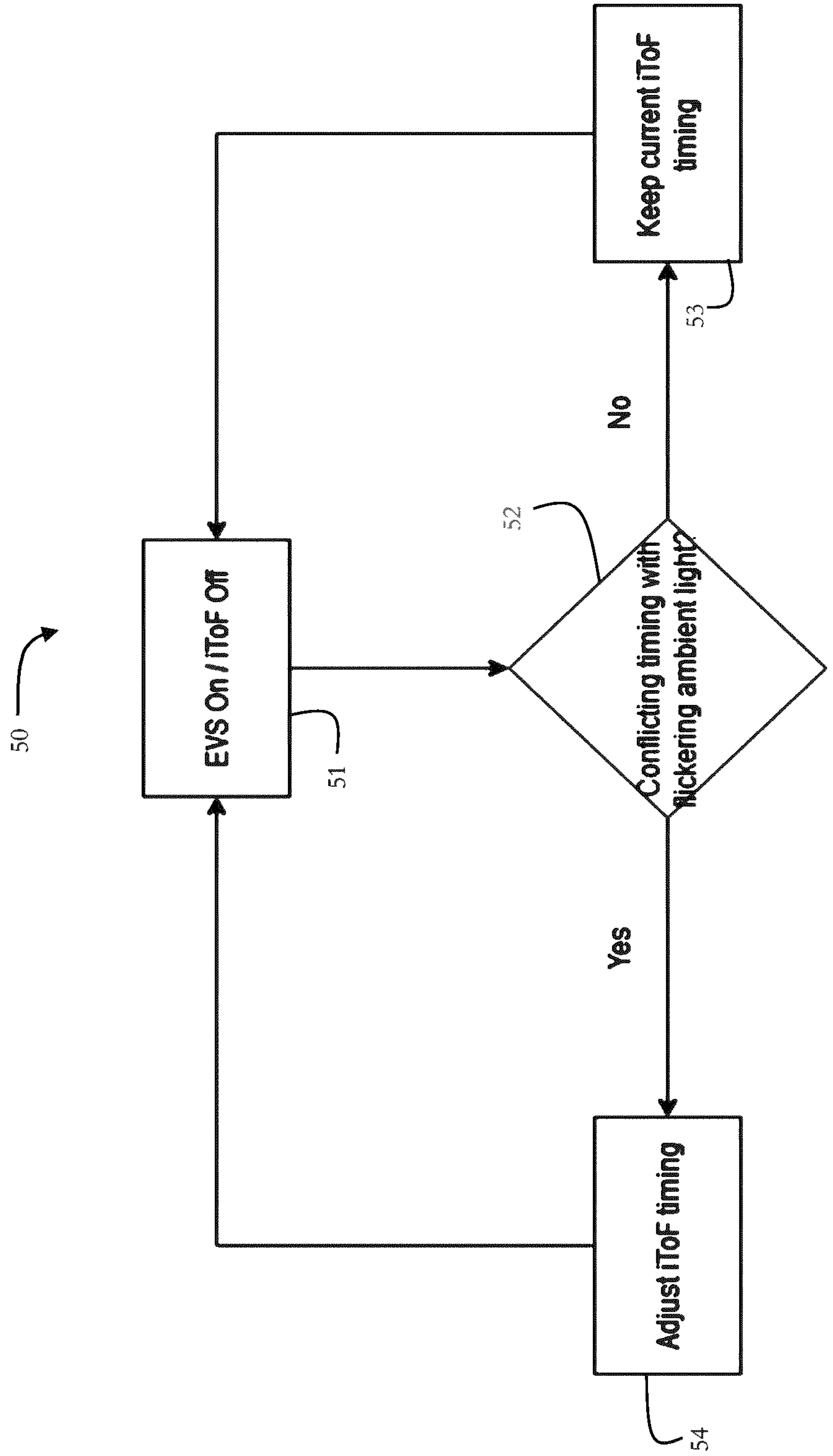
FIG. 6 depicts a ToF imaging apparatus control method according to the present disclosure in a block diagram.

FIG. 6 depicts a ToF imaging apparatus control method 50 according to the present disclosure in a block diagram.

At 51, an EVS is on while an iToF sensor is off. The EVS is configured to detect a plurality of light events, such that at least one light event pattern is determined.

At 52, it is determined whether the at least one light event pattern (flickering ambient light) is conflicting with a timing of a planned iToF measurement.

If not, at 53, the current iToF timing is kept.

If yes, at 54, the iToF timing is adjusted such that the iToF measurement is not disturbed by the ambient light.

FIG. 7 depicts further applications of the methods of the present disclosure when a structured light source is used. To such applications, it may be referred to as adaptive ToF sensing.

In FIG. 7*a*, a spot ToF light source 61 is used, in which a coherent light beam is diffracted by a diffractive optical element (DoE) 62, such that a spot light pattern is generated on an object 63.

According to the present disclosure, the light spots can be detected with an EVS, such that a field of view can be determined. Pixels of a ToF sensor can be selected which only measure the determined field of view.

In FIG. 7*b*, a scan ToF light source 64 is used including a micro-electromechanical system 65 (or a projector) generating a dynamic light structure 66, wherein a field of view can be determined with an EVS as in FIG. 7*a*.

In FIG. 7*c*, a zone ToF/wide ToF 67 is used including a plurality of VCSELs 68 (vertical cavity surface emitting laser diodes). The VCSELs are configured to generate light lobes 69 which can be directed on an object 70, such that a region of interest 71 can be illuminated (or which can illuminate a wide area, but by deactivating predetermined lobes, only the region of interest 71 is illuminated).

Hence, as in FIGS. 7*a* and 7*b*, only iToF pixels which are associated with EVS pixels which determined the region of interest or the field of view are demodulated. The region of interest can be updated based on the EVS (e.g. based on a maximum a posteriori estimation). The region of interest can also or alternatively be updated based on a previous ToF measurement (e.g. if an object tracking algorithm is used).

Alternative to any of the illumination systems of FIG. 7, a full-field illuminator may be used.

Figure 8:
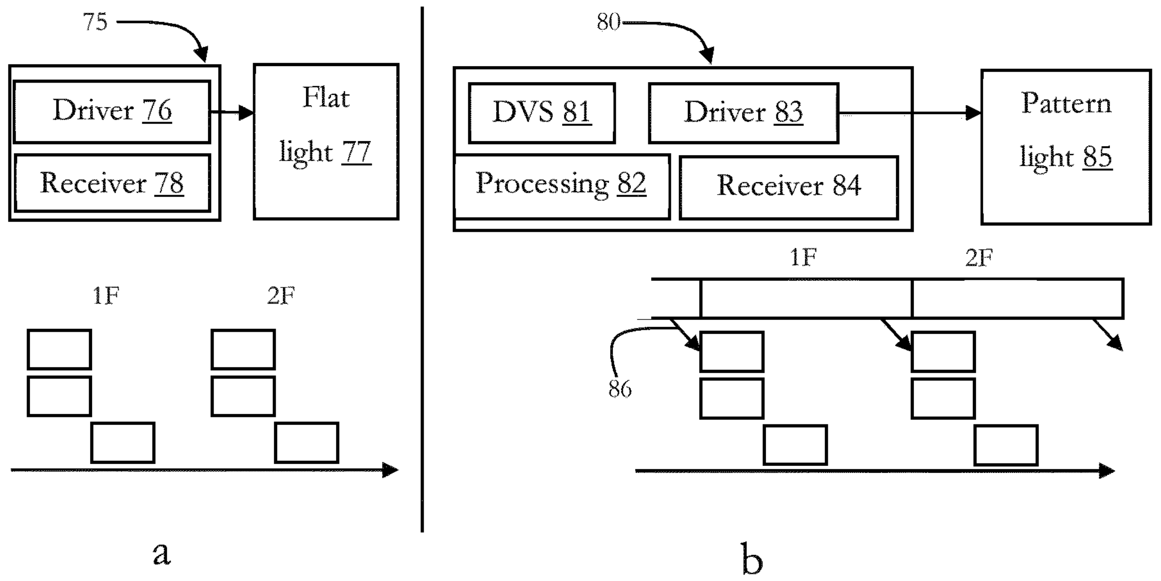
FIG. 8 depicts a ToF camera, as it is generally known, under reference of FIG. 8*a*, in comparison to a ToF imaging apparatus according to the present disclosure, under reference of FIG. 8*b;*

FIG. 8 depicts a ToF camera 75, as it is generally known, in the upper part (FIG. 8*a*), in comparison to a ToF imaging apparatus 80 according to the present disclosure, in the lower part (FIG. 8*b*).

The ToF camera 75 has a driver 76, which is configured to drive iToF pixels of an iToF sensor (i.e. apply demodulation signals and determine a distance) and to drive a light source to emit flat light 77.

Furthermore, the ToF camera 75 includes a receiver 78, i.e. the iToF sensor.

On the bottom of FIG. 8*a*, there is depicted an activity diagram including two frames (1F and 2F) of an iToF measurement. The activity diagram depicts an activity of the driver 76 and the receiver 78 in terms of a time in which they are idle.

In the first row, the activity of the driver 76 is shown. In the second and third row, the activity of the receiver 78 is shown, wherein the second row represents the integration time of the receiver 78 and the third row represents the readout time of the receiver 78.

The ToF imaging apparatus 80 of FIG. 8*b* includes a DVS 81, a processing unit 82, a driver 83 (the processing unit 82 and the driver 83 constituting demodulation circuitry and control circuitry according to the present disclosure), and a receiver 84.

The driver 83 is configured to control a light source (not depicted) to emit pattern light 85 (or structured light), as discussed with respect to FIG. 7. The DVS 81 detects event deriving from the pattern light 85. The processing unit 82 determines a light event pattern and controls the receiver 84 based on the determined light event pattern, as discussed herein.

On the bottom of FIG. 8*b*, there is depicted an activity diagram similar to the one of FIG. 8*a*. However, the activity diagram of FIG. 8*b* is different in that an activity of the DVS 81 and the processing unit 82 is shown in the first row of the activity diagram. Based on the light event pattern determined by the processing unit 82 with the DVS 81, an ROI is updated in the driver 83 (indicated with arrows 86).

Figure 9:
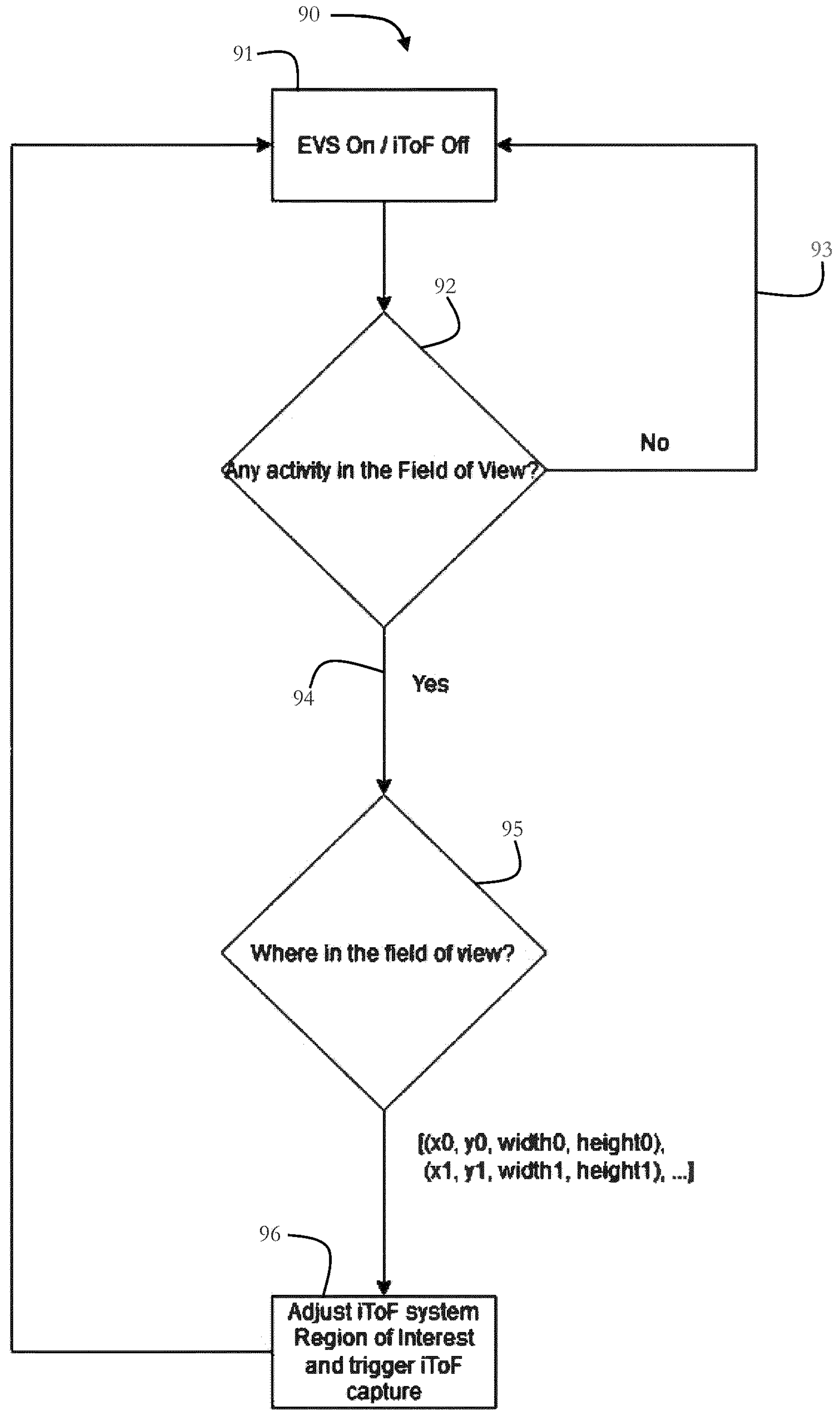
FIG. 9 depicts a ToF imaging apparatus control method according to the present disclosure in a block diagram.

FIG. 9 depicts a ToF imaging apparatus control method 90 according to the present disclosure in a block diagram.

At 91, an EVS is on, an iToF sensor is off.

At 92, it is determined, based on light events, whether there is any activity in a field of view. If there is no activity, the method goes back to 91.

If it is determined that there is activity in the field of view, at 94, the field of view is determined at 95. Symbolically, coordinates are depicted, wherein the present disclosure is not limited to coordinates as any data structure may be envisaged to define the field of view.

At 96, the pixels iToF sensor are adjusted to only capture the field of view and an iToF capture is triggered for the field of view.

Figure 10:
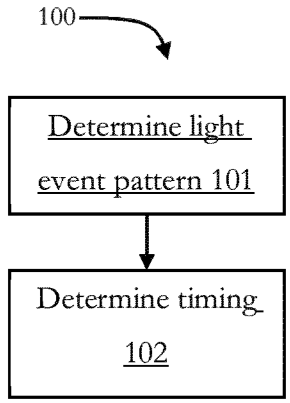
FIG. 10 depicts an embodiment of a ToF demodulation method according to the present disclosure in a block diagram.

FIG. 10 depicts an embodiment of a ToF demodulation method 100 according to the present disclosure in a block diagram.

At 101 a light event pattern is determined with an event-based light detection element of a plurality of event-based light detection elements, as discussed herein.

At 102 it is determined, for a demodulation element of a plurality of demodulation elements, a timing for a demodulation signal to be applied to the demodulation element based on the light event pattern, wherein the demodulation element is associated with the event-based light detection element, as discussed herein.

Figure 11:
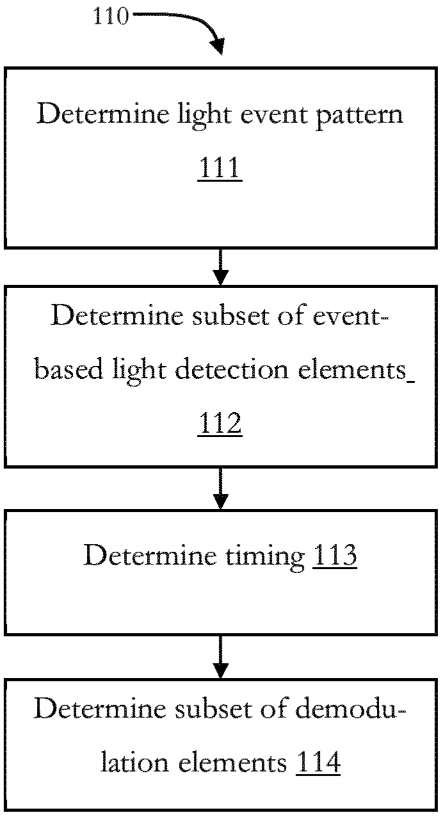
FIG. 11 depicts a further embodiment of ToF demodulation method according to the present disclosure in a block diagram.

FIG. 11 depicts a further embodiment of ToF demodulation method 110 according to the present disclosure in a block diagram.

At 111 a light event pattern is determined with an event-based light detection element of a plurality of event-based light detection elements, as discussed herein.

In this embodiment, 111 is performed for multiple event-based light detection element, such that at 112, a subset of the plurality of event-based light detection elements is determined, which have a common light event pattern, as discussed herein.

At 113, it is determined, for a demodulation element of a plurality of demodulation elements, a timing for a demodulation signal to be applied to the demodulation element based on the light event pattern, wherein the demodulation element is associated with the event-based light detection element, as discussed herein.

In particular, at 114, since 113 is carried out for multiple demodulation elements associated with subset of the event-based light detection elements, a subset of the plurality of demodulation elements is controlled based on the determined subset of event-based light detection elements, as discussed herein.

Figure 12:
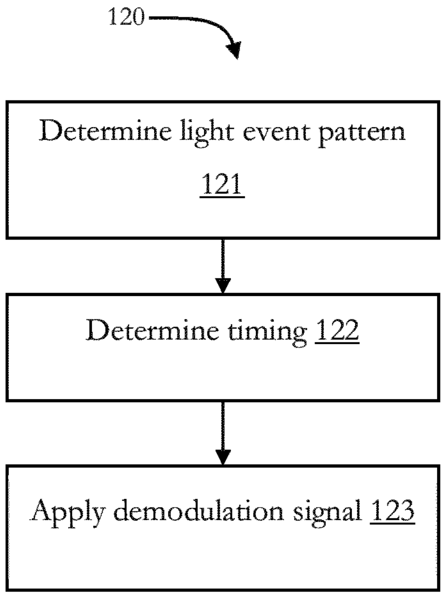
FIG. 12 depicts a further embodiment of ToF demodulation method according to the present disclosure in a block diagram.

FIG. 12 depicts a further embodiment of ToF demodulation method 120 according to the present disclosure in a block diagram.

At 121, a light event pattern is determined with an event-based light detection element of a plurality of event-based light detection elements, as discussed herein.

At 122 it is determined, for a demodulation element of a plurality of demodulation elements, a timing for a demodulation signal to be applied to the demodulation element based on the light event pattern, wherein the demodulation element is associated with the event-based light detection element, as discussed herein.

At 123, the demodulation signal is applied to the demodulation element between two consecutive light detection events, as discussed herein.

Figure 13:
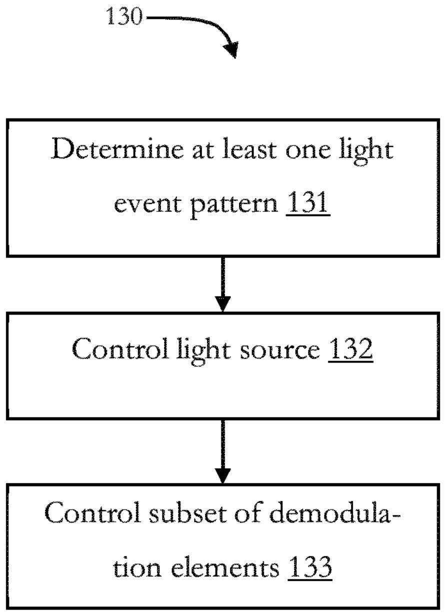
FIG. 13 depicts an embodiment of a ToF imaging apparatus control method according to the present disclosure in a block diagram.

FIG. 13 depicts an embodiment of a ToF imaging apparatus control method 130 according to the present disclosure in a block diagram.

At 131, at least one light event pattern is determined, as discussed herein.

At 132, a light source is controlled to emit modulated light based on the determined at least one light event pattern, as discussed herein.

At 133, a subset of a plurality of demodulation elements is controlled to apply a demodulation signal, if the at least one light event pattern is detected in a subset of associated event-based light detection elements, as discussed herein.

Figures 14, 15:
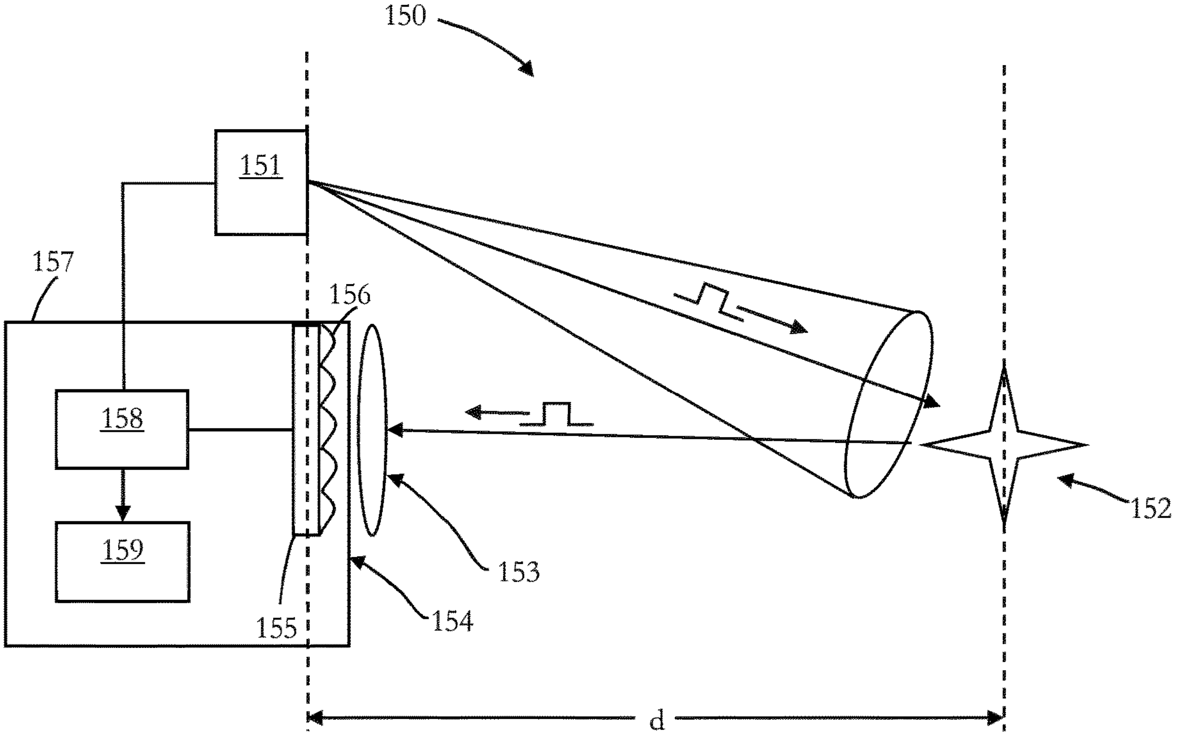
FIG. 14 depicts a further embodiment of a ToF imaging apparatus control method according to the present disclosure in a block diagram.
FIG. 15 illustrates an embodiment of a time-of-flight imaging apparatus.

FIG. 14 depicts a further embodiment of a ToF imaging apparatus control method 140 according to the present disclosure in a block diagram.

The control method 140 is different from the control method 130 in that, between 132 and 133, at 141, the plurality of event-based light detection elements is deactivated for a predetermined time after the light source emits the modulated light, as discussed herein. In this embodiment, the predetermined time is until, the iToF measurement is finished.

Referring to FIG. 15, there is illustrated an embodiment of a time-of-flight (ToF) imaging apparatus 150, which can be used for depth sensing or providing a distance measurement, in particular for the technology as discussed herein, wherein the ToF imaging apparatus 150 is configured as an iToF camera. The ToF imaging apparatus 150 has a hybrid image sensor circuitry 157 (including an EVS and an iToF sensor and including demodulation circuitry and control circuitry, as discussed herein), which is configured to perform the methods as discussed herein and which forms a control of the ToF imaging apparatus 150 (and it includes, not shown, corresponding processors, memory and storage, as it is generally known to the skilled person).

The ToF imaging apparatus 150 has a modulated light source 151 and it includes light emitting elements (based on laser diodes), wherein in the present embodiment, the light emitting elements are narrow band laser elements.

The light source 151 emits light, i.e. modulated light, as discussed herein, to a scene 152 (region of interest or object), which reflects the light. The reflected light is focused by an optical stack 153 to a light detector 154.

The light detector 154 has time-of-flight demodulation circuitry, as discussed herein, which is implemented based on multiple CAPDs formed in an array of pixels and a micro lens array 156 which focuses the light reflected from the scene 152 to the hybrid imaging portion 155 (to each pixel of the image sensor circuitry 157).

The light emission time and modulation information is fed to the hybrid image sensor circuitry or control 157 including a time-of-flight measurement unit 158, which also receives respective information from the hybrid imaging portion 155, when the light is detected which is reflected from the scene 152. On the basis of the modulated light received from the light source 151, the time-of-flight measurement unit 158 computes a phase shift of the received modulated light which has been emitted from the light source 151 and reflected by the scene 152 and on the basis thereon it computes a distance d (depth information) between the hybrid imaging portion 155 and the scene 152.

The depth information is fed from the time-of-flight measurement unit 158 to a 3D image reconstruction unit 159 of the hybrid image sensor circuitry 157, which reconstructs (generates) a 3D image of the scene 152 based on the depth data.

It should be recognized that the embodiments describe methods with an exemplary ordering of method steps. The specific ordering of method steps is however given for illustrative purposes only and should not be construed as binding. For example, the ordering of 92 and 95 in the embodiment of FIG. 9 may be exchanged. Also, the ordering of 141 and 133 in the embodiment of FIG. 14 may be exchanged. Other changes of the ordering of method steps may be apparent to the skilled person.

Please note that the division of the control 157 into units 158 and 159 is only made for illustration purposes and that the present disclosure is not limited to any specific division of functions in specific units. For instance, the control 157 could be implemented by a respective programmed processor, field programmable gate array (FPGA) and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) Time-of-flight demodulation circuitry configured to:
determine a light event pattern with an event-based light detection element of a plurality of event-based light detection elements; and
determine, for a demodulation element of a plurality of demodulation elements, a timing for a demodulation signal to be applied to the demodulation element based on the light event pattern, wherein the demodulation element is associated with the event-based light detection element.

(2) The time-of-flight demodulation circuitry of (1), further configured to:
determine a subset of the plurality of event-based light detection elements; and
control a subset of the plurality of demodulation elements based on the determined subset of event-based light detection elements.

(3) The time-of-flight demodulation circuitry of (2), wherein the subset of the plurality of event-based light detection elements is determined based on the light event pattern.

(4) The time-of-flight demodulation circuitry of anyone of (1) to (3), wherein the light event pattern is indicative of a plurality of consecutive light detection events.

(5) The time-of-flight demodulation circuitry of (4), further configured to:
apply the demodulation signal to the demodulation element between two consecutive light detection events.

(6) The time-of-flight demodulation circuitry of anyone of (1) to (5), wherein the light event pattern is representative of ambient light.

(7) A time-of-flight demodulation method comprising:

determining a light event pattern with an event-based light detection element of a plurality of event-based light detection elements; and determining, for a demodulation element of a plurality of demodulation elements, a timing for a demodulation signal to be applied to the demodulation element based on the light event pattern, wherein the demodulation element is associated with the event-based light detection element.

(8) The time-of-flight demodulation method of (7), further comprising:

determining a subset of the plurality of event-based light detection elements; and controlling a subset of the plurality of demodulation elements based on the determined subset of event-based light detection elements.

(9) The time-of-flight demodulation method of (8), wherein the subset of the plurality of event-based light detection elements is determined based on the light event pattern.

(10) The time-of-flight demodulation method of anyone of (7) to (9), wherein the light event pattern is indicative of a plurality of consecutive light detection events.

(11) The time-of-flight demodulation method of (10), further comprising:

applying the demodulation signal to the demodulation element between two consecutive light detection events.

(12) The time-of-flight demodulation method of anyone of (7) to (11), wherein the light event pattern is representative of ambient light.

(13) A computer program comprising program code causing a computer to perform the method according to anyone of (7) to (12), when being carried out on a computer.

(14) A non-transitory computer-readable recording medium that stores therein a computer program product, which, when executed by a processor, causes the method according to anyone of (7) to (12) to be performed.

(15) A time-of-flight imaging apparatus comprising:

a plurality of event-based light detection elements each configured to detect a light event, based on which at least one light event pattern is determined;

a plurality of demodulation elements, wherein each demodulation element is associated with at least one event-based imaging element;

a light source configured to emit modulated light; and control circuitry configured to:

determine the at least one light event pattern;

control the light source to emit modulated light based on the determined at least one light event pattern; and control a subset of the plurality of demodulation elements to apply a demodulation signal, if the at least one light event pattern is detected with a subset of associated event-based light detection elements.

(16) The time-of-flight imaging apparatus of (15), further comprising:

a first imaging portion including the plurality of event-based light detection elements; and a second imaging portion including the plurality of demodulation elements.

(17) The time-of-flight imaging apparatus of (16), wherein the second imaging portion is disposed between the first imaging portion and the light source.

(18) The time-of-flight imaging apparatus of anyone of (15) to (17), further comprising:

an imaging portion including the plurality of event-based light detection elements and the plurality of demodulation elements.

(19) The time-of-flight imaging apparatus of anyone of (15) to (18), wherein the light event pattern is representative of ambient light.

(20) The time-of-flight imaging apparatus of anyone of (15) to (19), the control circuitry being further configured to:

deactivate the plurality of event-based light detection elements for a predetermined time after the light source emits the modulated light.

(21) A time-of-flight imaging apparatus control method for a time-of-flight imaging apparatus, wherein the time-of-flight imaging apparatus includes a plurality of event-based light detection elements each configured to detect a light event, based on which at least one light event pattern is determined; a plurality of demodulation elements, wherein each demodulation element is associated with at least one event-based imaging element; and a light source configured to emit modulated light; the method comprising:

determining the at least one light event pattern;

controlling the light source to emit modulated light based on the determined at least one light event pattern; and controlling a subset of the plurality of demodulation elements to apply a demodulation signal, if the at least one light event pattern is detected in a subset of associated event-based light detection elements.

(22) The time-of-flight imaging apparatus control method of (21), further comprising:

deactivating the plurality of event-based light detection elements for a predetermined time after the light source emits the modulated light.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

(23) A time-of-flight imaging apparatus comprising:

a plurality of event-based light detection elements configured to detect a light structure;

a plurality of demodulation elements configured to generate time-of-flight data, wherein each demodulation element is associated with at least one event-based imaging element;

a light source configured to emit structured light; and control circuitry configured to: correct the time-of-flight data based on the light structure.

(24) The time-of-flight imaging apparatus of (23), wherein the light structure is based on the structured light.

(25) The time-of-flight imaging apparatus of (23) or (24), further configured to:

determine a multipath interference based on the light structure.

(26) The time-of-flight imaging apparatus of (25), further configured to:

correct the time-of-flight data based on the determined multipath interference.

(27) The time-of-flight imaging apparatus of (25) or (26), further configured to:

project a spot pattern on a scene for determining the light structure; and project a full-field pattern on the scene for determining the time-of-flight data.

(28) The time-of-flight imaging apparatus of (25) or (26), further configured to:

project a spike pattern on a scene for determining the light structure and the time-of-flight data.

(29) The time-of-flight imaging apparatus of anyone of (23) to (28), further configured to:

correct the time-of-flight data by extending a distance range of the time-of-flight data based on the light structure.

(30) A time-of-flight imaging apparatus control method, wherein the time-of-flight imaging apparatus includes a plurality of event-based light detection elements configured to detect a light structure; a plurality of demodulation elements configured to generate time-of-flight data, wherein each demodulation element is associated with at least one event-based imaging element; and a light source configured to emit structured light; the control method comprising:

correcting the time-of-flight data based on the light structure.

(31) The time-of-flight imaging apparatus control method of (30), wherein the light structure is based on the structured light.

(32) The time-of-flight imaging apparatus control method of (30) or (31), further comprising:

determining a multipath interference based on the light structure.

(33) The time-of-flight imaging apparatus control method of (32), further comprising:

correcting the time-of-flight data based on the determined multipath interference.

(34) The time-of-flight imaging apparatus control method of (32) or (33), further comprising:

projecting a spot pattern on a scene for determining the light structure; and projecting a full-field pattern on the scene for determining the time-of-flight data.

(35) The time-of-flight imaging apparatus control method of (32) or (33), further configured to:

projecting a spike pattern on a scene for determining the light structure and the time-of-flight data.

(36) The time-of-flight imaging apparatus of anyone of (30) to (35), further configured to:

correcting the time-of-flight data by extending a distance range of the time-of-flight data based on the light structure.

(37) A computer program comprising program code causing a computer to perform the method according to anyone of (30) to (36), when being carried out on a computer.

(38) A non-transitory computer-readable recording medium that stores therein a computer program product, which, when executed by a processor, causes the method according to anyone of (30) to (36) to be performed.

The invention claimed is:

1. Time-of-flight demodulation circuitry configured to:

determine a light event pattern from a plurality of light events detected by an event-based light detection element of a plurality of event-based light detection elements, each light event of the plurality of light events corresponding to a detected change of light intensity at the event-based light detection element; and determine, for a demodulation element of a plurality of demodulation elements that is associated with the event-based light detection element, a timing for a demodulation signal to be applied to the demodulation element based on the light event pattern, such that the demodulation signal is applied relative to the plurality of light events.

2. The time-of-flight demodulation circuitry of claim 1, further configured to:

determine a subset of the plurality of event-based light detection elements; and control a subset of the plurality of demodulation elements based on the determined subset of event-based light detection elements.

3. The time-of-flight demodulation circuitry of claim 2, wherein the subset of the plurality of event-based light detection elements is determined based on the light event pattern.

4. The time-of-flight demodulation circuitry of claim 1, wherein the light event pattern is determined from a plurality of consecutive light detection events, each consecutive light detection event being individually generated by the event-based light detection element in response to a respective change of light intensity independently of other event-based light detection elements of the plurality of event-based light detection elements.

5. The time-of-flight demodulation circuitry of claim 4, further configured to:

apply the demodulation signal to the demodulation element between two consecutive light detection events.

6. The time-of-flight demodulation circuitry of claim 1, wherein the light event pattern is representative of ambient light.

7. A time-of-flight demodulation method comprising:

determining a light event pattern from a plurality of light events detected by an event-based light detection element of a plurality of event-based light detection elements, each light event of the plurality of light events corresponding to a detected change of light intensity at the event-based light detection element; and determining, for a demodulation element of a plurality of demodulation elements that is associated with the event-based light detection element, a timing for a demodulation signal to be applied to the demodulation element based on the light event pattern, such that the demodulation signal is applied relative to the plurality of light events.

8. The time-of-flight demodulation method of claim 7, further comprising:

determining a subset of the plurality of event-based light detection elements; and controlling a subset of the plurality of demodulation elements based on the determined subset of event-based light detection elements.

9. The time-of-flight demodulation method of claim 8, wherein the subset of the plurality of event-based light detection elements is determined based on the light event pattern.

10. The time-of-flight demodulation method of claim 7, wherein the light event pattern is determined from a plurality of consecutive light detection events, each consecutive light detection event being individually generated by the event-based light detection element in response to a respective change of light intensity independently of other event-based light detection elements of the plurality of event-based light detection elements.

11. The time-of-flight demodulation method of claim 10, further comprising:

applying the demodulation signal to the demodulation element between two consecutive light detection events.

12. The time-of-flight demodulation method of claim 7, wherein the light event pattern is representative of ambient light.

13. A time-of-flight imaging apparatus comprising:

a plurality of event-based light detection elements, each event-based light detection element configured to detect a light event corresponding to a change of light intensity, based on which at least one light event pattern is determined from a plurality of detected light events;

a plurality of demodulation elements, wherein each demodulation element is associated with at least one event-based imaging element;

a light source configured to emit modulated light; and control circuitry configured to:

determine the at least one light event pattern;

control the light source to emit modulated light based on the determined at least one light event pattern; and control a subset of the plurality of demodulation elements to apply a demodulation signal relative to the plurality of detected light events, if the at least one light event pattern is detected with a subset of associated event-based light detection elements.

14. The time-of-flight imaging apparatus of claim 13, further comprising:

a first imaging portion including the plurality of event-based light detection elements; and a second imaging portion including the plurality of demodulation elements.

15. The time-of-flight imaging apparatus of claim 14, wherein the second imaging portion is disposed between the first imaging portion and the light source.

16. The time-of-flight imaging apparatus of claim 13, further comprising:

an imaging portion including the plurality of event-based light detection elements and the plurality of demodulation elements.

17. The time-of-flight imaging apparatus of claim 13, wherein the light event pattern is representative of ambient light.

18. The time-of-flight imaging apparatus of claim 13, the control circuitry being further configured to:

deactivate the plurality of event-based light detection elements for a predetermined time after the light source emits the modulated light.

19. A time-of-flight imaging apparatus control method for a time-of-flight imaging apparatus, wherein the time-of-flight imaging apparatus includes a plurality of event-based light detection elements, each event-based light detection element configured to detect a light event corresponding to a change of light intensity, based on which at least one light event pattern is determined from a plurality of detected light events; a plurality of demodulation elements, wherein each demodulation element is associated with at least one event-based imaging element; and a light source configured to emit modulated light; the method comprising:

determining the at least one light event pattern;

controlling the light source to emit modulated light based on the determined at least one light event pattern; and controlling a subset of the plurality of demodulation elements to apply a demodulation signal relative to the plurality of detected light events, if the at least one light event pattern is detected in a subset of associated event-based light detection elements.

20. The time-of-flight imaging apparatus control method of claim 19, further comprising:

deactivating the plurality of event-based light detection elements for a predetermined time after the light source emits the modulated light.

* * * * *